United States Patent [19]

Minicozzi

[11] Patent Number: 5,586,843
[45] Date of Patent: Dec. 24, 1996

[54] INDEXABLE CUTTING INSERT FOR ROTARY CUTTING TOOLS

[75] Inventor: Alfonso Minicozzi, Montreal, Canada

[73] Assignee: International Minicut, Inc., Montreal, Canada

[21] Appl. No.: 295,758

[22] PCT Filed: Mar. 2, 1993

[86] PCT No.: PCT/CA93/00083
§ 371 Date: Sep. 1, 1994
§ 102(e) Date: Sep. 1, 1994

[87] PCT Pub. No.: WO93/17822
PCT Pub. Date: Sep. 16, 1993

[30] Foreign Application Priority Data

Mar. 3, 1992 [CA] Canada .................. 2062213

[51] Int. Cl.$^6$ ..................... B23C 5/00
[52] U.S. Cl. ............... 407/42; 407/63; 407/113
[58] Field of Search ............. 407/47, 48, 51, 407/59, 60, 61, 63, 103, 113, 114, 42

[56] References Cited

U.S. PATENT DOCUMENTS

| | | |
|---|---|---|
| 2,782,489 | 2/1957 | Hargrove et al. . |
| 3,058,199 | 10/1962 | Cave et al. . |
| 3,117,366 | 1/1964 | Castor, Sr. . |
| 3,129,492 | 4/1964 | Strasmann . |
| 3,157,938 | 11/1964 | Sabberwal et al. . |
| 3,548,476 | 12/1970 | Cave et al. . |
| 3,574,251 | 4/1971 | Corti . |
| 3,739,442 | 6/1973 | Lovendahl . |
| 3,775,819 | 12/1973 | Ribich . |
| 3,792,515 | 2/1974 | Lundgren . |
| 3,798,723 | 3/1974 | Czopor et al. . |
| 3,861,011 | 1/1975 | Nose et al. . |
| 4,130,371 | 12/1978 | Druxeis .................. 407/114 |
| 4,182,587 | 1/1980 | Striegl . |
| 4,215,955 | 8/1980 | Lillie . |
| 4,556,345 | 12/1985 | Philippi . |
| 4,573,831 | 3/1986 | Lacey . |
| 4,681,485 | 7/1987 | Koelewijn . |
| 4,699,549 | 10/1987 | Shimomura et al. . |
| 4,714,383 | 12/1987 | Shimomura et al. . |
| 4,729,697 | 3/1988 | Lacey . |
| 4,764,059 | 8/1988 | Wale . |
| 4,812,087 | 3/1989 | Stashko . |
| 4,934,878 | 6/1990 | Plutschuck et al. . |
| 5,207,538 | 5/1993 | Satran .................. 407/113 |
| 5,209,611 | 5/1993 | Drescher .................. 407/48 |

FOREIGN PATENT DOCUMENTS

| | | |
|---|---|---|
| 502795 | 5/1934 | Canada . |
| 533141 | 11/1956 | Canada . |
| 900703 | 5/1972 | Canada . |
| 1033560 | 6/1978 | Canada . |
| 1074985 | 4/1980 | Canada . |
| 1097899 | 3/1981 | Canada . |
| 1154943 | 10/1983 | Canada . |
| 1270631 | 6/1990 | Canada . |
| 125568 | 11/1984 | European Pat. Off. ......... 407/114 |
| 278389 | 2/1988 | European Pat. Off. . |
| 473177 | 3/1992 | European Pat. Off. . |
| 505574 | 9/1992 | European Pat. Off. . |
| 2042472 | 2/1971 | France . |
| 2431897 | 3/1980 | France .................. 407/114 |

Primary Examiner—S. Thomas Hughes
Attorney, Agent, or Firm—Laff, Whitesel, Conte & Saret, Ltd.

[57] ABSTRACT

A cutting insert having helically arranged teeth, each comprising a six sided block having two major parallel rhomboid-shaped plane surfaces constituting a seating face and a clearance face respectively, two opposed minor side surfaces constituting cutting faces extending between the seating and clearance faces, each cutting face forming an acute angle with the clearance face and forming a cutting edge along the intersection therewith, and two minor parallel plane end faces extending between the seating face and the two cutting faces. Each cutting face has a concave curvature located centrally of its major dimension, and a convex curvature at each end of its major dimension to define a serpentine cutting face and cutting edge. When disposed along the helically arranged teeth of a rotary cutting tool, such as a milling cutter, the inserts form a cutting face, or a radial face, having a continuously variable positive radial rake angle, and a cutting edge of serpentine configuration which generally parallels the helical form of the teeth.

18 Claims, 5 Drawing Sheets

INDEXABLE CUTTING INSERT FOR ROTARY CUTTING TOOLS

BACKGROUND OF THE INVENTION

This invention relates to cutting inserts for rotary cutting tools, and, more particularly, indexable cutting inserts for rotary cutting tools such as milling cutters having helically arranged teeth.

For illustrative purposes, this specification will describe the invention as it pertains to a conventional milling cutter,. i.e., a milling cutter having a shank portion and a cutting portion of cylindrical configuration, the cutting portion containing a plurality of helically disposed gullets extending from the shank end of the cutting portion to the free end thereof, which gullets define a plurality of helically arranged teeth. In such a milling cutter, the cutting edges, which comprise the leading edges of the teeth defined by the gullets, lie on a substantially constant radius with respect to the longitudinal axis of the tool, throughout the length of the cutting portion. However, the invention may have application to other types of milling cutters, and other types of cutting tools which have helically arranged teeth and which utilize replaceable cutting inserts.

In a conventional rotary cutting tool wherein the teeth and cutting edges are integral with the tool body, the cutting edges of the teeth may be sharpened, within defined limits. However, generally speaking when the cutting edges become worn or damaged beyond restoration, the entire tool must be discarded, and, as such tools conventionally comprise very expensive high performance cutting steels, the replacement of such tools entails considerable expense.

Accordingly, replaceable cutting inserts are frequently mounted on tool bodies in such a manner that the inserts are readily replaceable, and are so disposed along the teeth of the cutting tool that they comprise the cutting edges of the teeth. In this way, the cutting tool may be composed of a lesser quality steel, and only the cutting inserts may be composed of hard wear resistant material, suitable for metal cutting applications, such as hardened tungsten carbide. The cost of the tool itself may therefore be reduced and if the cutting edge, or portions of the cutting edge of the tool becomes subject to damage or excessive wear, it is only necessary to replace the inserts, or some of the inserts, to restore the cutting edge. This can frequently be accomplished with relative simplicity in a few minutes. Indeed, in many cases the cutting inserts are indexable, in the sense that they comprise two or more essentially identical cutting edges, and it is only necessary to remove the insert and rotate it to appropriately introduce a new cutting edge into position in order to renew a damaged or excessively worn cutting edge or a portion of the cutting edge.

SUMMARY OF THE INVENTION

The present invention relates to a novel cutting insert of the type described and a novel cutting edge configuration formed by such inserts which exhibit improved cutting performance and reduced power requirements.

In accordance with one aspect of the invention, a cutting insert for use in a rotary cutting tool having helically arranged teeth comprises a six sided block having two major parallel thombold-shaped plane surfaces constituting a seating face and a clearance face respectively, two opposed minor side surfaces constituting cutting faces extending between said seating and clearance faces, each said cutting face forming an acute angle with the clearance face, and forming a cutting edge along the intersection therewith, and two minor parallel plane end faces extending between said seating and clearance faces and said two cutting faces. Each cutting face is provided with a concave curvature centrally of its major dimension, and convex curvature at each end of its major dimension to define a serpentine cutting face and cutting edge. Such inserts, when disposed along the helically arranged teeth of a rotary cutting tool result in a cutting face or radial rake face having a continuously variable positive radial rake angle, and a cutting edge which parallels the helical form of the teeth.

In a further aspect, the invention resides in a rotary cutting tool comprising a cutting portion having a longitudinal axis and a plurality of helically arranged teeth separated by helical gullets extending the length of the cutting portion, with the leading edge of each tooth comprising a plurality of sockets containing cutting tool inserts of the type described above. The sockets are of complementary shape to the cutting tool inserts, and are so disposed along each tooth edge that the inserts are arranged along the leading edge of each tooth, substantially the length thereof, with cutting edges in operable relationship thereto. The cutting edges of the inserts in each tooth form an interrupted cutting edge of serpentine configuration which generally parallels the leading edge of the tooth and exhibits a cutting face or radial rake face having a continuously variable positive radial rake angle throughout its length.

The cutting edge thus created by the array of such cutting inserts results in the creation of discontinuous lens shaped chips from a workpiece subjected to the action of the cutting tool, which chips are readily removed from the work area. The continuously varying positive rake angle of the cutting edge so created results in increased cutting efficiency and reduced power consumption.

DESCRIPTION OF THE PREFERRED EMBODIMENTS

Figure 1:
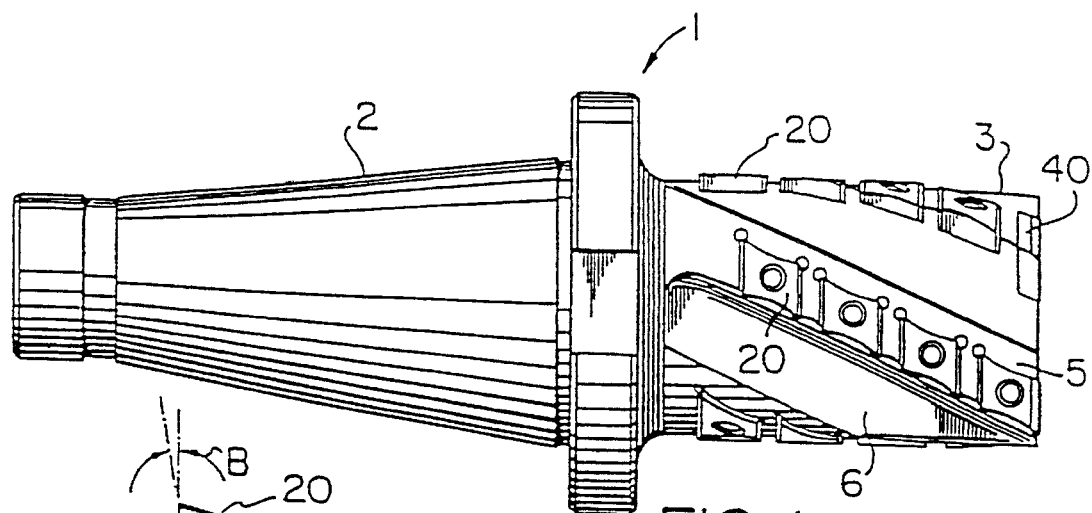
FIG. 1 is a side view of a milling cutter with helically arranged teeth and cutting inserts in accordance with the invention.
Figure 2:
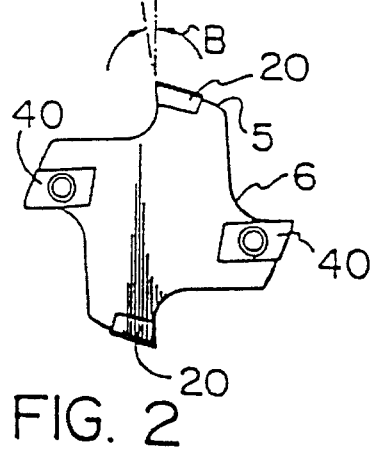
FIG. 2 is an end view of the cutting portion of the milling cutter of FIG. 1.
Figure 3:
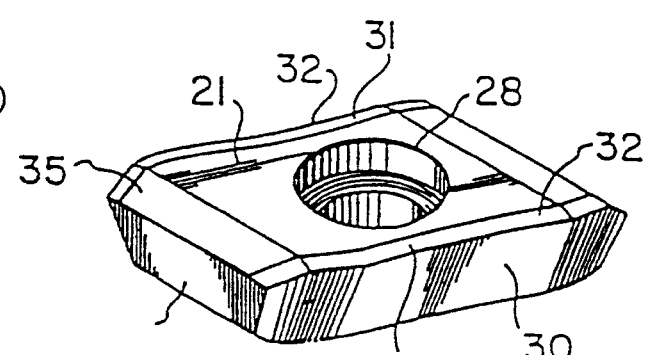
FIG. 3 is a perspective view of a cutting insert in accordance with the invention.

Referring now to FIGS. 1 and 2, the milling cutter is illustrated generally by the reference numeral 1, and comprises a shank portion 2, and a cylindrical cutting portion 3. The shank portion is conventional, and will not be described further herein. The cutting portion comprises four helically arranged teeth 5 separated by gullets 6. Typically the helix angle is about 25°, but it may range between 5° and 60°. Disposed along the leading edge of each tooth, substantially from the shank end to the free end of the cutting portion, are a plurality of cutting inserts 20 of identical shape. Special end cutting inserts 40 are provided to complete the cutting edge of those teeth in which an insert 20 is not seated at the extreme free end thereof.

Figure 4:
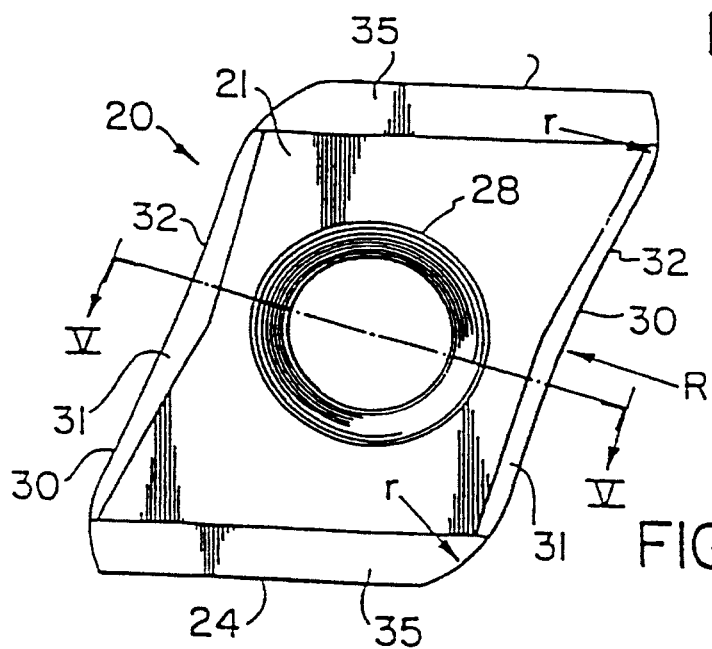
FIG. 4 is a top plan view of the cutting insert of FIG. 3.
Figure 5:
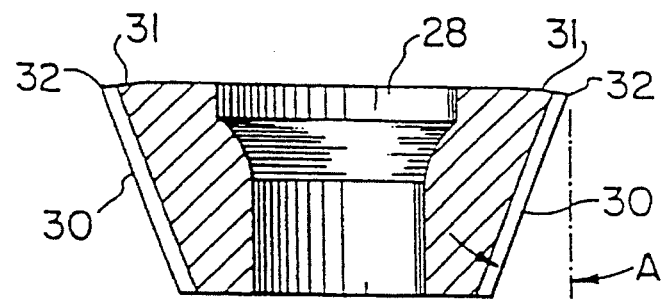
FIG. 5 is a cross-section of the cutting insert of FIG. 4 along line V—V.
Figure 6:
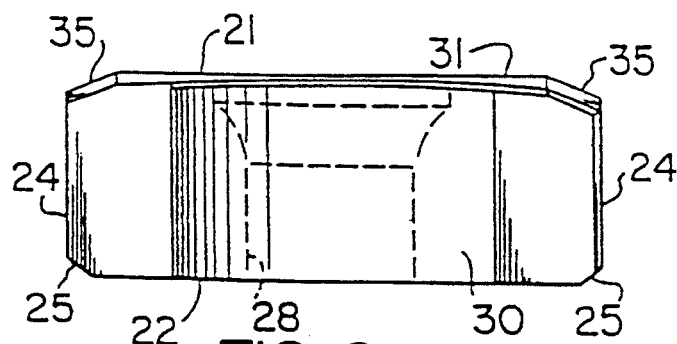
FIG. 6 is a side view of the cutting insert of FIG. 4 in the direction of arrow R.

The individual inserts 20 are best depicted in FIGS. 3 through 6. Each of the inserts 20 comprises a relatively thin six sided block having an upper planar clearance face 21 which is generally rhomboid-shaped, and a lower planar seating face 22 which is also generally rhomboid-shaped. The insert has two minor planar end faces 24, and two minor side surfaces 30. The side surfaces comprise cutting faces of the insert and each forms an acute angle A (as shown in FIG. 5) with the plane of the clearance face 21. Typically the angle A is 20°, although it may vary widely depending upon the desired rake angle of the cutting edge formed by the insert. The inserts themselves are about 16 mm long, about 11 mm wide and about 5 mm thick, although, of course, these dimensions may vary widely.

The cutting faces 30 are essentially identical. As best illustrated in FIG. 4, the cutting faces exhibit a concave curvature of radius R centrally of their major dimension, and a convex curvature of radius r at each end thereof. For purposes of illustration, the radius R may be 50 mm and the radius r 30 mm. The intersection of the cutting faces 30 with the clearance face 21 forms two cutting edges 32, and, as a result of the aforementioned geometry, the cutting edges 32 are of substantially identical serpentine configuration, and result in a cutting face or radial rake face which exhibits a continuously variable positive radial rake angle B from end to end, when operably mounted in a cutting tool as will be described below.

In a conventional manner, the clearance face is relieved slightly, (typically at an angle of about 6°) to form a relatively narrow land surface 31 at each cutting edge. The clearance face and the seating face are chamfered at 35 and 25 respectively to avoid unnecessary sharp edges and corners, and thus minimize the likelihood of chipping or breakage.

For the purpose of connecting the insert to the tool body, the insert is provided with a through bore 28. This is conventional and is typical of the means of attaching cutting inserts to tool bodies, with the result that it need not be described in further detail.

As will be seen from FIGS. 1 and 2, the inserts are disposed along the cutting edge of each tooth and in generally complementary shaped sockets. The sockets are depicted in greater detail in FIGS. 7, 8 and 9. Socket ends 24' are complementary with ends 24 of the cutting insert, and an inboard side 30' forms an acute angle A with the upper surface of the tooth and exhibits a convex curvature R centrally of its major dimension, and concave curvature r at each end thereof. The angles, radius and dimensions of the socket are generally the same as the corresponding angles, radius and dimensions of an insert but the socket is so dimensioned as to snuggly receive an insert therein. The base 22' of each socket has disposed therein a threaded blind hole 28' which is aligned with the through hole 28 of the cutting insert and which cooperates with a threaded screw (not specifically illustrated) to operatively secure the insert in the socket to the cutting portion of the cutting tool in a conventional manner.

Figure 8:
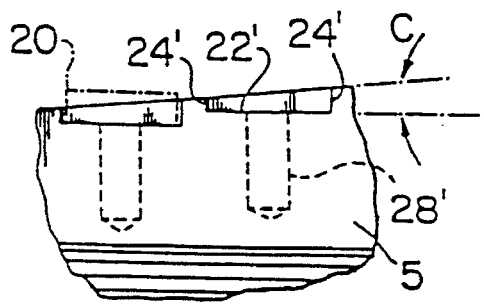
FIG. 8 is a front view of the tooth segment of FIG. 7.
Figure 9:
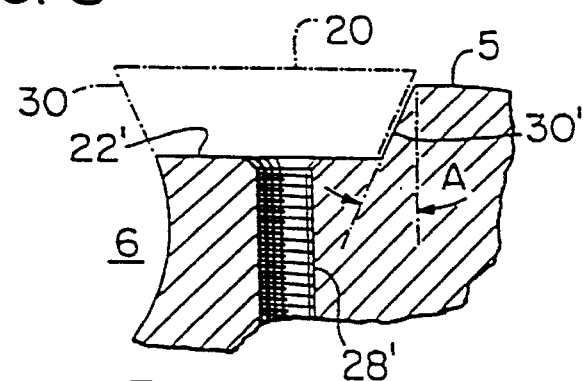
FIG. 9 is a cross-section of the tooth segment of FIG. 7 along the line IX—IX.

As is best illustrated in FIG. 8, the base 22' of the socket slopes down slightly at an angle C of about 6° toward the free end of the cutting portion of the tool so that the insert 30, depicted in dotted lines in FIGS. 8 and 9, projects slightly above the outer face of the cutting portion at the end of the socket remote from the free end of the cutting portion to substantially flush with the outer surface of the cutting portion at the end of the socket closest to the free end of the cutting portion. This slope is designed to maintain the top of the cutting edge parallel with respect to the longitudinal axis of the tool. The slope will vary depending upon the length of the inserts and the helix angle of the teeth. Further, that portion of the gullet 6 which forms the leading edge of each tooth 5 as illustrated in the FIG. 1 is in general alignment with the cutting or rake face 30 of the insert as depicted in FIGS. 1 and 9.

Figure 10:
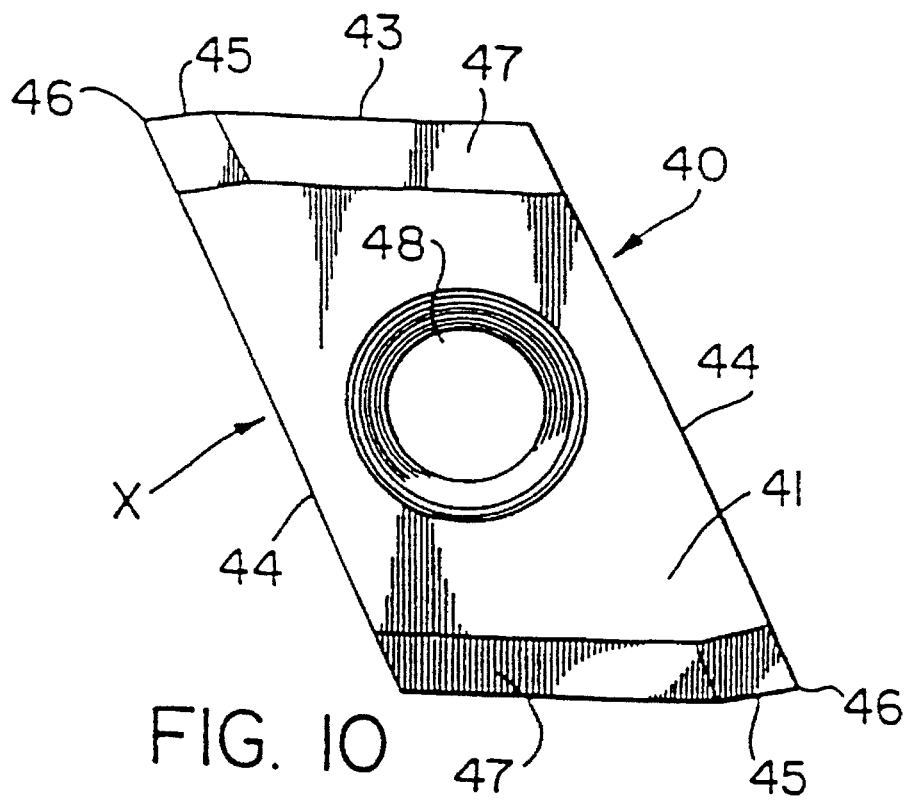
FIG. 10 is a top plan view of an end cutting insert for the milling cutter of FIG. 1.
Figure 11:
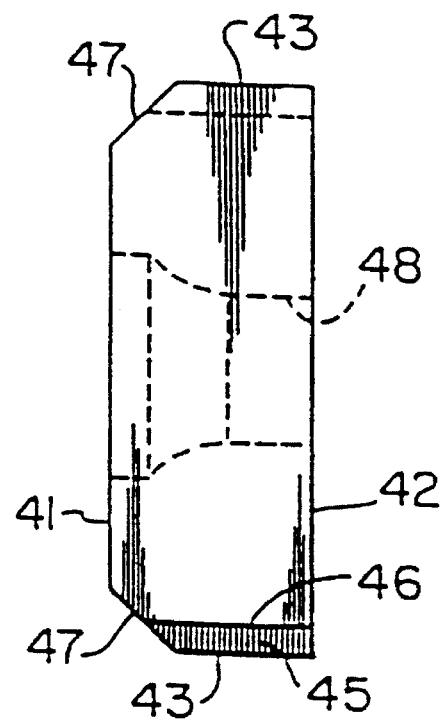
FIG. 11 is a side view of the end cutting insert of FIG. 10 in a direction of arrow X.
Figure 12:
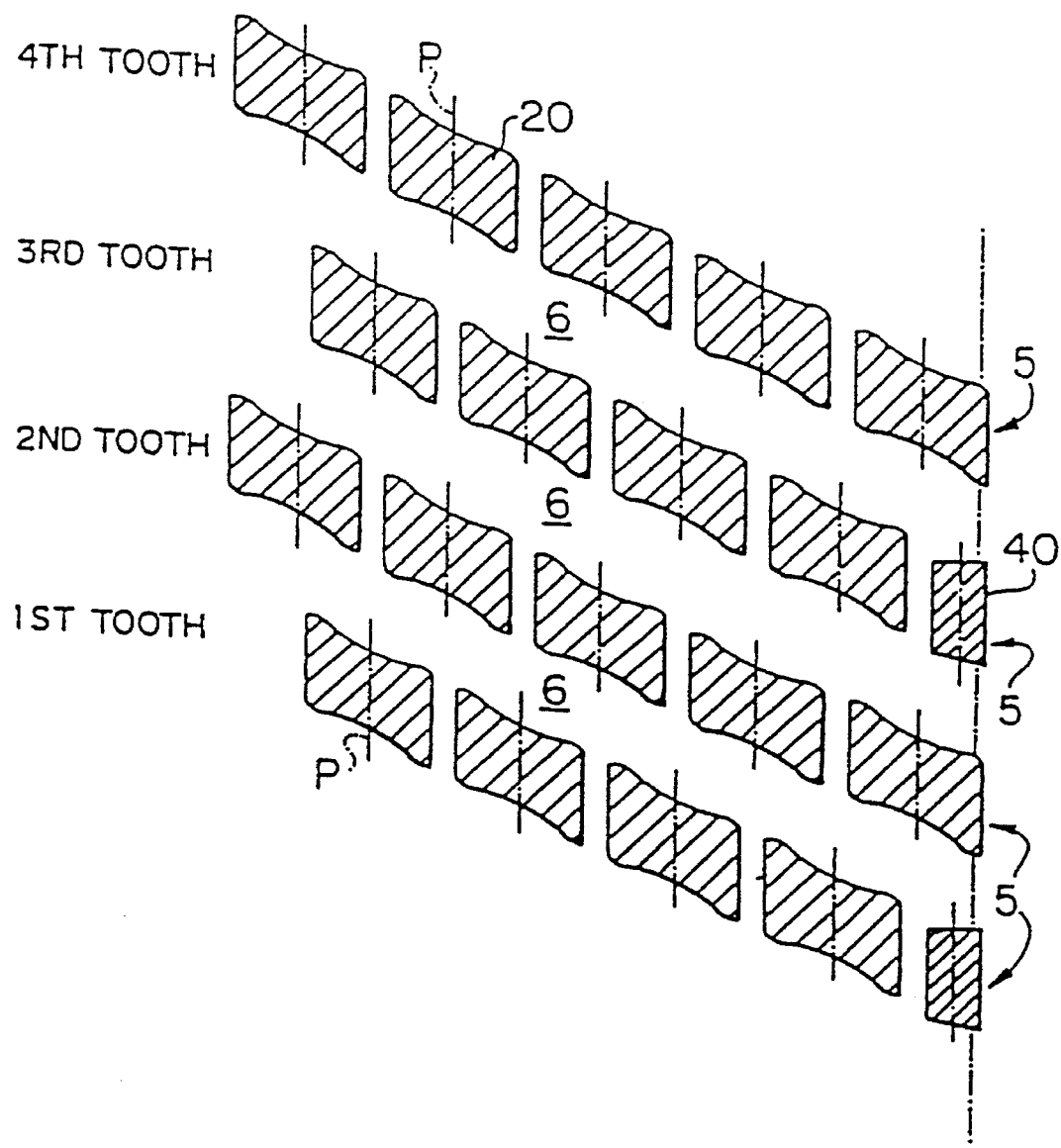
FIG. 12 is a developed view of the cutting portion of the milling cutter of FIG. 1.

As depicted in FIG. 1, and the developed view thereof in FIG. 12, the cutting inserts are so arranged along the teeth 5 that inserts in adjacent teeth are axially displaced so that an insert on one tooth will be disposed midway between the transverse central planes P of adjacent inserts of an adjacent tooth. As a result, if the inserts are so arranged on some teeth, such as the second and fourth tooth illustrated in FIG. 12, that the tooth terminates at its free end with the end of a complete insert, there will be a gap at the end of the adjacent teeth, for example the first and third teeth. Accordingly, provision is made for attachment of a short end cutting insert at the end of each such tooth in order to provide a cutting edge along each tooth which extends substantially to the free end of the cutting portion of the tool. Such an insert 40 is depicted in FIGS. 10 and 11.

The end inserts 40 are conventional and need not be described in detail. They comprise a substantially planar outer or clearance face 41 which is generally rhomboid-shaped, and a substantially planar seating face 42 which is also substantially rhomboid-shaped. The end cutting inserts 40 also comprise substantially planar minor end faces 43 and substantially planar minor side faces 44. The end faces 43 are relieved slightly at 45 and form, at the intersection with side face 44 in the relieved area, a cutting edge 46. The clearance face 41 is chamfered at 47 in a conventional manner to eliminate sharp edges and corners susceptible to chipping or breakage. A through hole 48 is provided in a conventional manner for attachment of the end insert to the free end of the cutting portion of the milling cutter as depicted in FIG. 2.

Figure 7:
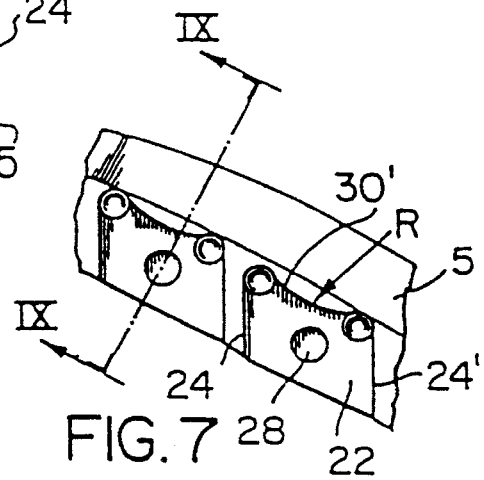
FIG. 7 is a top view of a segment of a tooth cutting edge illustrating the pockets formed therein.

As will appear from FIG. 1 and FIG. 12, the inserts are so arranged along each tooth as to form a generally serpentine cutting edge which generally parallels the helical path of the leading edge of the tooth, and is interrupted by the gaps between adjacent sockets which, in this particular embodiment, are spaced apart slightly as illustrated in FIG. 1, and in greater detail in FIGS. 7 and 8. The cutting edge of each tooth as defined by the cutting edges of the inserts arranged along the leading edge of the tooth exhibits a continuously variable positive rake angle as result of the tooth and insert geometry, i.e., the combined effect of the helix angle of the teeth and the serpentine rake face and cutting edge arising from the convex curvature of the rake face at each end of each insert, and the concave curvature of the rake face of each insert centrally of its major dimension results in the continuously variable positive radial rake angle. This form of insert, and the arrangement of the inserts along the leading edge of each tooth differs from any insert and arrangement of inserts of which applicant is aware, in that the cutting face and cutting edge of each tooth, as created by its inserts, follows the helical path of the leading edge of each tooth, and gives rise to a serpentine rake face and cutting edge which exhibits a continuously varying radial rake angle along the length of the cutting edge of each tooth.

As is best seen in FIG. 12, the inserts of one tooth are axially displaced relative to the inserts of an adjacent tooth so that, in a plane transverse to the longitudinal axis of the cutting portion of the tooth, the concave curvature of the cutting face of one insert will overlap the convex curvatures of the cutting faces of adjacent inserts in an adjacent tooth. In this way the gaps between inserts on one tooth are covered by an insert on an adjacent tooth to produce a continuous effective cutting edge.

Figure 13:
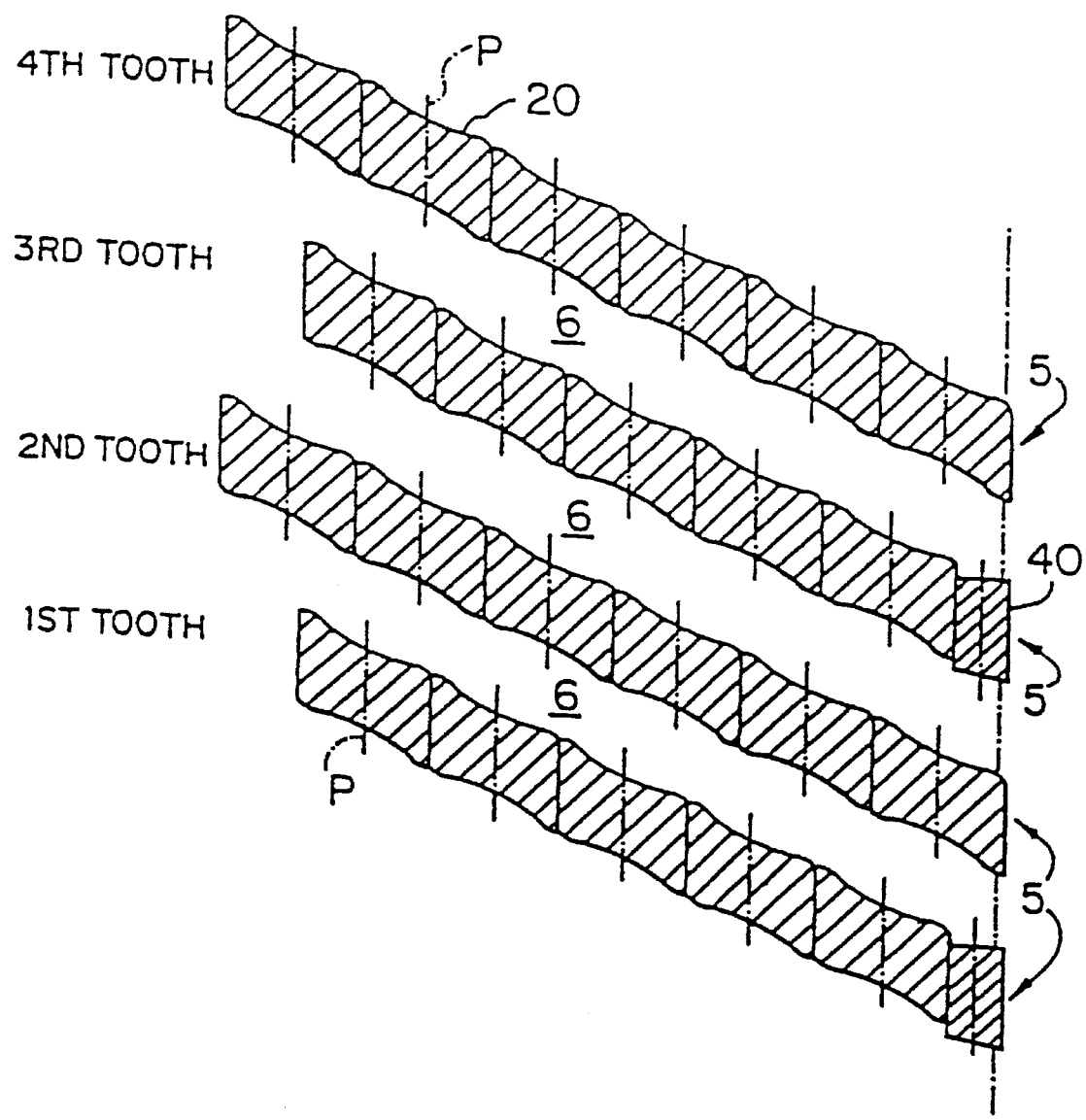
FIG. 13 is a developed view of the cutting portion of a modified milling cutter.

An arrangement has been depicted in FIGS. 1 through 12 in which the insert sockets are spaced one from the other in a regular spacing. It is also possible to arrange the inserts so that their minor end faces 24 abut, leaving no distinct spacing between the inserts. A developed view of such an arrangement is depicted in FIG. 13, and it will be readily seen that this arrangement results in a substantially continuous rake face and cutting edge which follows the helical path of each tooth. There are however slight interruptions in the cutting edge, which result from the chamfers 35, as depicted for example in FIG. 6, which result in the formation of a slight chip breaker gaps in the cutting edges. These gaps, which are more pronounced in the embodiment depicted in the FIGS. 1 to 12, result in the formation of discontinuous chips which are more readily removed from the work area.

It is, of course, to be understood that the present invention is, by no means, limited to the particular construction shown in the drawing, but also comprises any modifications within the scope of the appended claims. It will be appreciated that the cutting tools may vary considerably in diameter and size, and that the helix angle of the flutes as well as the rake angles, the number of teeth, etc. may also vary. It is well known in the construction of cutting tools that such aspects of the tools may also vary depending upon the cutting effect desired.

I claim:

1. A cutting insert for use in a rotary cutting tool having helically arranged teeth, comprising, a six sided block having a longitudinal axis and two major parallel rhomboid-shaped plane surfaces constituting a seating face and a clearance face respectively, two opposed minor side surfaces constituting cutting faces extending parallel to said longitudinal axis and extending between said seating and clearance faces, each said cutting face forming an acute angle with said clearance face and forming a cutting edge along the intersection therewith, and two minor parallel plane end faces extending between said seating and clearance faces and said two cutting faces; each said cutting face having a concave curvature centrally of its major dimension, and convex curvature at each end of its major dimension to define a serpentine cutting face and cutting edge.

2. A cutting insert as defined in claim 1 wherein each cutting edge is substantially identically configured.

3. A cutting insert as defined in claim 2 wherein the radius of said concave curvature is greater than the radius of said convex curvature.

4. A cutting insert as defined in claim 3 wherein the radius of said concave curvature is approximately double the radius of said convex curvature.

5. A cutting insert as claimed in claim 3 wherein said seating and clearance faces are chamfered along the intersection with said end faces.

6. A cutting insert as claimed in claim 5 wherein said clearance face is relieved adjacent each cutting face to form a relatively narrow land surface along each cutting edge.

7. A cutting insert as defined in claim 6 including means for securing said cutting insert to a rotary cutting tool body.

8. A cutting insert as defined in claim 7 wherein said means for securing said insert to a rotary cutting tool body comprises a through hole perpendicular to said clearance and seating faces and disposed centrally thereof whereby said cutting insert may be indexed by rotation about the axis of the through hole.

9. A cutting insert as defined in claim 6, wherein said acute angle is about 20° the radius of said concave curvature is about 50 mm and the radius of said convex curvature is about 30 mm.

10. A rotary cutting tool comprising a cutting portion having a longitudinal axis and a plurality of helically arranged teeth separated by helical gullets extending the length of said cutting portion, the leading edge of each tooth comprising a plurality of sockets and cutting inserts disposed in said sockets, each cutting insert comprising a six sided block having a longitudinal axis and two major parallel rhomboid-shaped plane surfaces constituting a seating face and a clearance face respectively, two opposed minor side surfaces constituting cutting faces extending parallel to said longitudinal axis and extending between said seating and clearance faces, each said cutting face forming an acute angle with said clearance face and forming a cutting edge along the intersection therewith, and two minor parallel plane and faces extending between seating and clearance faces and said two cutting faces, each said cutting face having a concave curvature centrally of its major dimension, and convex curvature at each end of its major dimension to define a serpenting cutting face and cutting edge; said sockets being of complementary shape to said cutting inserts and so disposed along each tooth that said cutting inserts are arranged along the leading edge of each tooth substantially the length thereof, with cutting edges in operable relationship thereto and in substantially parallel relationship with the leading edge of said tooth.

11. A rotary cutting tool as defined in claim 10 wherein said cutting portion is cylindrical and wherein the cutting edge along each tooth formed by said inserts is of serpentine configuration and exhibits a continuously variable positive radial rake angle.

12. A rotary cutting tool as defined in claim 11 wherein the helix angle of said teeth with respect to the longitudinal axis of said cutting portion falls within the range 5° to 60°.

13. A rotary cutting tool as defined in claim 12 wherein said helix angle is 25°.

14. A rotary cutting tool as defined in claim 11 wherein inserts on one tooth are displaced axially with respect to the inserts of the adjacent tooth whereby a concave curvature of an insert on one tooth overlaps the convex curvatures of adjacent inserts on an adjacent tooth in a plane through said inserts transverse to the longitudinal axis of said cutting portion.

15. A rotary cutting tool as defined in claim 14 wherein said inserts are arranged along said teeth in abutting relationship.

16. A rotary cutting tool as defined in claim 14 wherein said inserts are arranged along said teeth in regularly spaced relationship.

17. A rotary cutting tool as defined in claim 15 wherein said cutting edges are interrupted between adjacent cutting inserts.

18. A rotary cutting tool as defined in claim 16 wherein said cutting edges are interrupted between adjacent cutting inserts.

* * * * *